April 29, 1924.
C. A. BICKFORD
LITHOGRAPH OVEN DRIVING MECHANISM
Filed Aug. 2, 1923  3 Sheets-Sheet 2
1,492,284
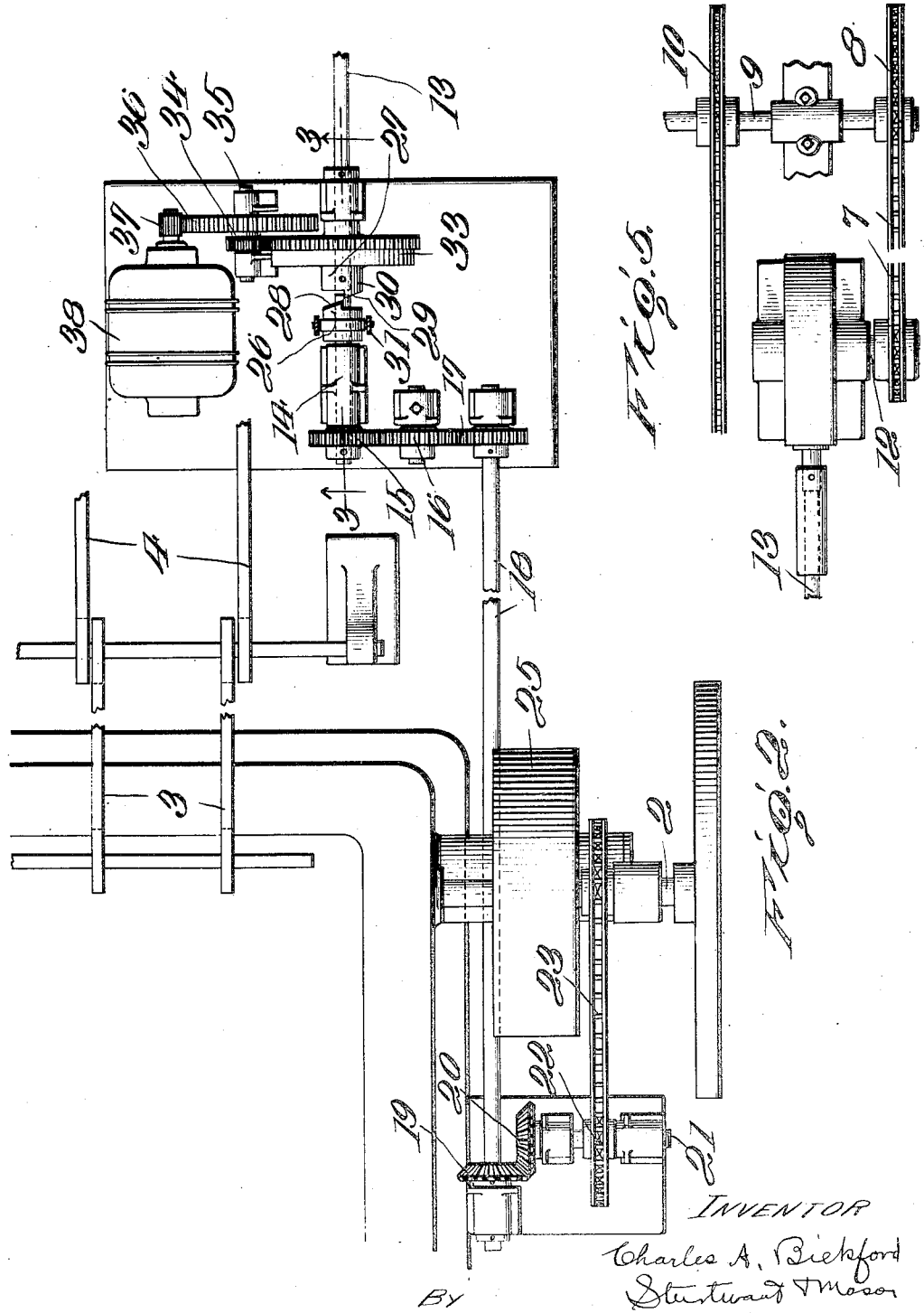

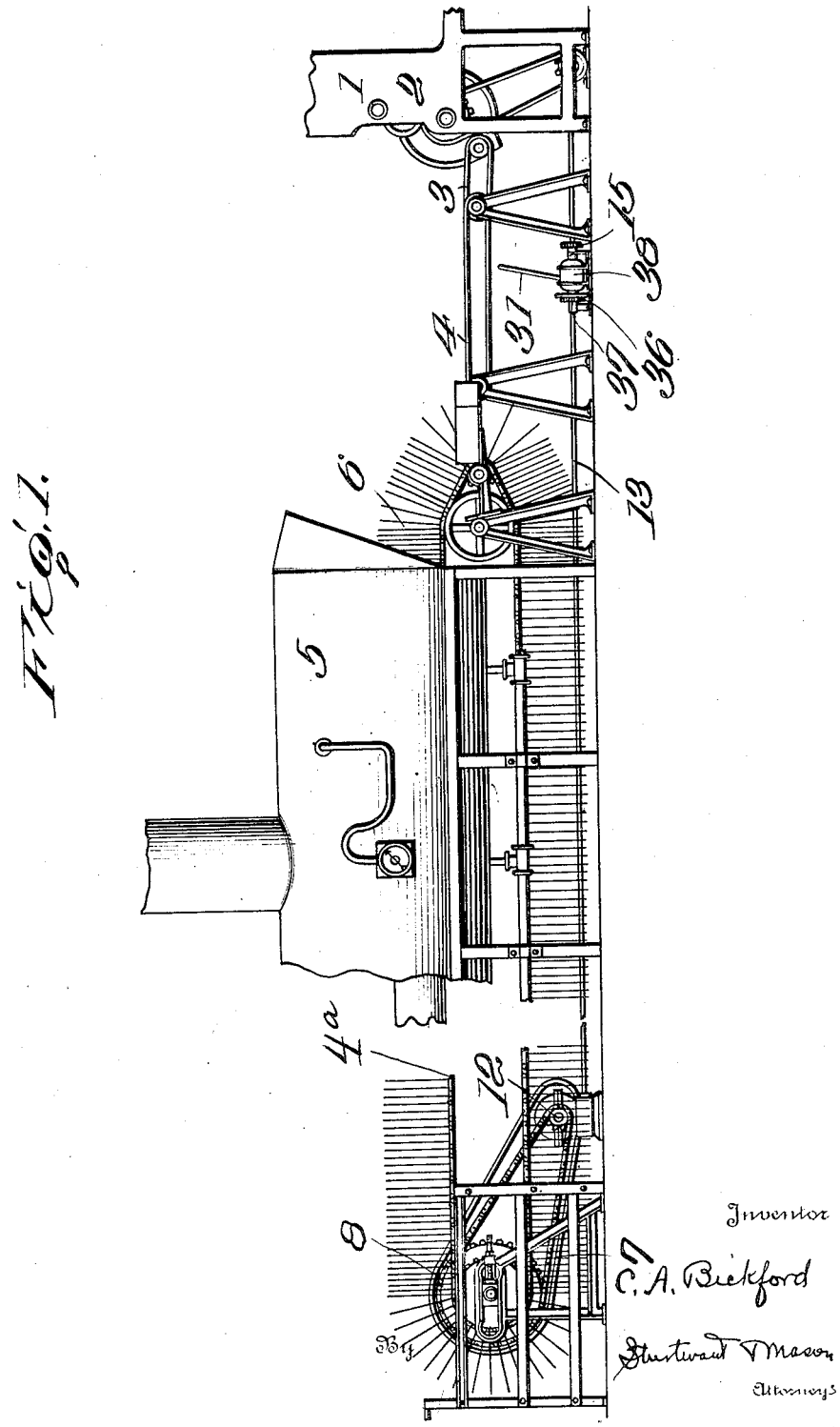

April 29, 1924.
C. A. BICKFORD
LITHOGRAPH OVEN DRIVING MECHANISM
Filed Aug. 2, 1923  3 Sheets-Sheet 3
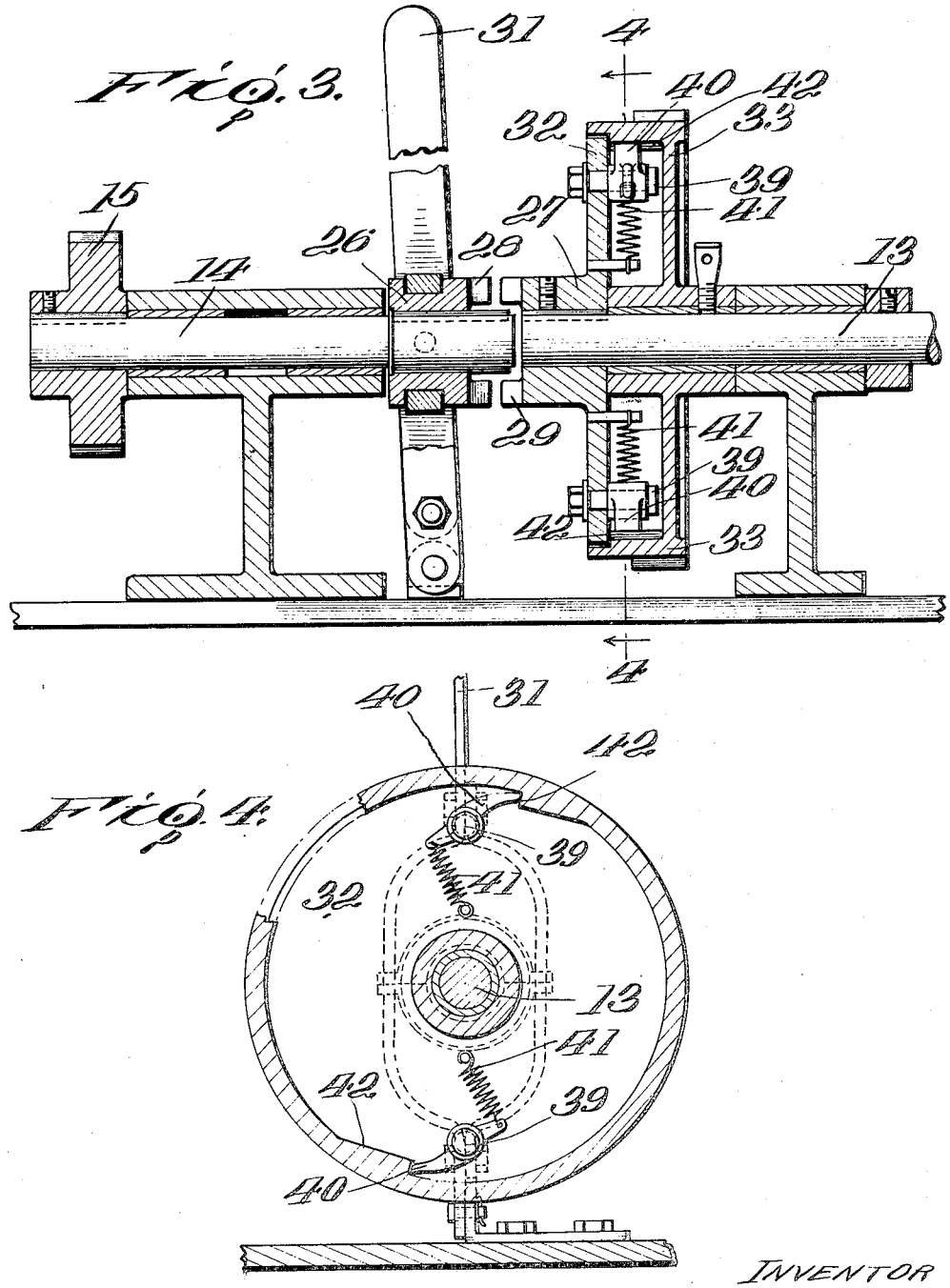
INVENTOR
Charles A. Bickford
BY
Sturtevant & Mason
ATTORNEYS.

Patented Apr. 29, 1924.

1,492,284

UNITED STATES PATENT OFFICE.

CHARLES A. BICKFORD, OF RIVERSIDE, ILLINOIS, ASSIGNOR TO PHOENIX-HERMETIC COMPANY, OF CHICAGO, ILLINOIS, A CORPORATION OF NEW YORK.

LITHOGRAPH-OVEN DRIVING MECHANISM.

Application filed August 2, 1923. Serial No. 655,250.

*To all whom it may concern:*

Be it known that I, CHARLES A. BICKFORD, a citizen of the United States, residing at Riverside, in the county of Cook, State of Illinois, have invented certain new and useful Improvements in Lithograph-Oven Driving Mechanism, of which the following is a description, reference being had to the accompanying drawing and to the figures of reference marked thereon.

The invention relates to new and useful improvements in the driving mechanism for a lithographing oven, and more particularly to a mechanism of the above type which is in turn driven by the same power mechanism which drives the lithograph press.

It is a well-known fact that, when the lithograph press is to be stopped for any reason and the drying oven is operated by the same power mechanism, the oven must be emptied of the lithograph plates before it is stopped, or otherwise the plates would stay in the heat too long. An object of the present invention is to provide automatic means for disconnecting the oven from the lithograph press when said press is slowed down during stopping, and for automatically connecting the conveyor of said lithograph oven to an auxiliary driving means whereby said oven conveyer continues to operate and thus all danger of the lithograph plates remaining in the heat too long is avoided.

In the drawings, which show by way of illustration one embodiment of the invention:—

Figure 1 is a view showing diagrammatically in side elevation a combined driving means for a press and lithograph oven and embodying the invention;

Fig. 2 is a plan view of the automatic means for disconnecting the press from the oven when said press is slowed down, and for connecting and driving the conveyor of the oven by an auxiliary driving means;

Fig. 3 is a sectional view on the line 3—3 of Fig. 2;

Fig. 4 is a sectional view on the line 4—4 of Fig. 3; and

Fig. 5 is an enlarged detail showing the connecting means between the end of the oven driving shaft and the oven conveyor.

The invention is directed broadly to a combined driving means for a lithograph press and a conveyor of a drying oven for the lithograph sheets. The press driving means is connected to the conveyor of the oven so that, when both the press and the conveyor are in operation, the oven conveyor will be driven in synchronism with the press, so that the sheets will be caused to pass one after the other between the brackets or arms of the conveyor for the oven. The conveyor for the oven carries the sheets through the oven in a fixed time so that the pigments of the lithograph ink are properly oxidized and not damaged in any way by remaining in the heat an excessive length of time.

It is often necessary to stop the press in order to change from one color to another, or for other purposes, and heretofore it has been the practice to empty the oven of all lithograph sheets before the press is shut down. The present invention, however, provides means which will enable the oven conveyor to be disconnected from the press if it is slowed down, and automatically connected to an auxiliary driving means so that the oven conveyor continues to convey the sheets through the oven but at a slightly slower speed while the press is shut down, and until it is emptied.

The conveyor for the oven is driven by a shaft extending longitudinally of the oven and connected by my improved clutch, and through suitable gears so that said oven conveyor is driven in proper synchronism with the press. Associated with the clutch is a gear driven by an auxiliary power mechanism, which gear is driven at slower speed than the speed of the oven shaft when said oven shaft is driven by the press. Automatic clutch dogs are provided which connect said gear to the oven shaft when the oven shaft is released from the press driving means, and said dogs are disconnected from the oven shaft when the oven shaft is driven at a greater speed than said auxiliary driving gear. The oven shaft is connected to the press through a clutch which is automatically disconnected when the press slows down, and the oven shaft is thus retarded. At the same time, the retarding of the oven shaft will cause the auxiliary driven gear to connect thereto and become the driving means therefor.

I have shown in the drawings, more or less diagrammatically, the preferred form of driving mechanism and have als shown embodied therein my improvements above referred to. In Fig. 1 of the drawings, the lithograph press is indicated at 1, and this lithograph press is driven from a suitable source of power, such as a belt running over a pulley wheel mounted on the main shaft 2 of the press. This press is of the usual construction, and it is not thought necessary to refer to the same more in detail.

The plates, when they pass through the press, are received by conveyor belts 3—3 carried by an auxiliary frame that may be raised and lowered in order to give access to the lithograph press. From these endless belts, the plates are passed to the endless belts 4, and the endless belts 4 convey the plates one after the other into the conveyor for the drying oven. The drying oven is indicated at 5 in the drawings. This oven is preferably of the type shown in the patent to T. L. Taliaferro, No. 1,446,947, dated February 27, 1923, and a detail description thereof is not thought necessary.

The conveyor consists of endless chains or connected links 4ª which carry arms 6 between which the plates are placed. This endless conveyor passes through the oven and then returns from beneath the oven, and as it moves from the lower horizontal position to the upper horizontal position, the arms are supported so that the plates may be placed between said arms of the conveyors 4.

The endless conveyor 4ª is driven by a sprocket chain 7 running over a sprocket wheel 8 on the shaft 9, and this shaft 9 carries sprocket wheels 10 for the endless chain or link conveyor. The sprocket wheel 8 is driven by means of the sprocket chain 7 from a sprocket wheel on a short shaft 12, and this short shaft 12 is connected from a suitable reduction gear to a shaft 13 which extends lengthwise of the oven and from the rear end thereof, where the driving connection is made to the endless conveyor for the oven to the front end thereof adjacent the lithograph press.

In line with the shaft 13 is a short shaft 14, see Fig. 2. This shaft 14 is driven by suitable gears 15, 16 and 17 from a shaft 18. The shaft 18 carries a beveled gear 19 which meshes with a beveled gear 20 on a short shaft 21. On the shaft 21 is a sprocket wheel 22 with which a sprocket chain 23 cooperates. The sprocket chain 23 in turn engages a sprocket wheel on the main shaft 2 of the lithograph press. The lithograph press in the present instance carries a belt wheel 25 through which the press is driven.

Between the shafts 13 and 14 there is an auxiliary driving mechanism and a clutch. The member 26 of the clutch has a spline connection with the shaft 14 so that said member rotates with the shaft and is capable of endwise movement thereon. The member 27 of the clutch is rigidly secured to the end of the shaft 13. The two adjacent faces of the clutch parts are formed with oppositely facing shoulders 28 and 29 in rear of which are inclined members 30. It will readily be seen that, when these shoulders 28 and 29 are locked together, then the shaft 14 may become a driving shaft for rotating the shaft 13. The member 26 is moved endwise on the shaft 14 by a hand lever 31. This brings the shoulders into locked engagement.

It will readily be seen, however, that, if the shaft 14 for any reason slows down while the shaft 13 continues in its rotation, the inclined faces 30 cooperate with each other to force the movable member 26 of the clutch to the position shown in Fig. 3. In other words, the clutch will be automatically disengaged if the shaft 14 is caused to run at slower speed than the shaft 13.

The member 27 of the clutch is provided with a radially extending disk 32. Freely mounted on the shaft 13 is a gear wheel 33. This gear wheel 33 meshes with a gear wheel 34 carried by a short shaft 35 and the gear wheel 36 on said short shaft meshes with a gear wheel 37 of a motor 38. While I have shown a motor, it will be understood, of course, that any other suitable source of power may be substituted for the motor for driving the gear 37.

The motor operates the gear wheel 33 and causes it to continuously rotate on the shaft 13. The speed of this gear wheel 33 is less than the normal speed of the oven shaft 13 when driven from the lithograph press through the clutch members 26 and 27. In other words, the motion imparted to the shaft 13 by the auxiliary motor 38 is so reduced that it is slower speed than the motion imparted by the press drive. The disk 32 is provided with diametrically disposed studs 39 which are similar in construction. On each stud there is a dog 40 which is moved outwardly away from the center of the disk by means of a spring 41. The gear wheel 33 is provided with shoulders 42 also diametrically disposed to each other.

These shoulders are adapted to be engaged by the dogs 40 under certain conditions. The dogs are so arranged that under other conditions they will run over the inclined faces leading to the shoulders 42. When the dogs engage these shoulders, then the gear wheel 33 becomes a driving means for driving the disk 32, and through the sleeve of the clutch member 27 which is rigid on the shaft 13 drives said shaft 13. It will be readily seen, however, that the disk 32 may be driven at a faster speed than the gear 33 and the dogs will ride over these shoulders.

In the operation of the device, the lever 31 is thrown so as to bring the clutch members 26 and 27 into engagement and the press started, and this will cause the conveyor of the oven to be driven from the mechanism which drives the press. The auxiliary motor is also started, which will set the gear wheel 33 into rotation from this auxiliary source of power. As noted above, this gear wheel 33, however, is driven at slower speed than the speed of the disk 32 when connected to the lithograph press and, therefore, the dogs 40 will run idly over the shoulders 42 approaching the same by a counter-clockwise movement, as viewed in Fig. 4.

When it is found necessary or desirable to shut down the press, as soon as the press slows down, the speed of the shaft 13 will also slow down until the speed of the disk 32 is less than that of the speed of the gear wheel 33. Then the dogs 40 will be brought into engagement with the shoulders 42 on the disk 32 and the auxiliary driving mechanism will then become the power for driving the shaft 13. A continued slowing down of the press while the shaft 13 is kept in motion will cause the cam faces of the clutch members 26 and 27 to ride one on the other and throw out the clutch member 26 which will remain out in view of the fact that the lever 31 is substantially vertical and there is no pressure therefrom tending to force the clutch members into engagement.

From the above, it will be apparent that, when the press is stopped, the conveyor of the oven will only be slowed down to a certain extent and will continue in operation, driven by the auxiliary driving means so that the oven conveyor will continue in carrying the sheets through the oven until the oven is emptied of the sheets and no harm can come to the sheets being lithographed by standing for too long a period in the heat of the oven.

It is obvious that minor changes in the details of construction may be made without departing from the spirit of the invention as set forth in the appended claims.

What I claim is:—

1. The combination of a lithograph press and a drying oven, a conveyor for the drying oven adapted to receive the lithographed plates from the press and convey the same through the oven, means for driving said press and said oven conveyor in synchronism, means for automatically disconnecting said conveyor from said press driving means when the press driving means is slowed down during stopping, an auxiliary source of power, and devices driven thereby for automatically connecting to and driving the conveyor when said conveyor is released from the press driving means.

2. The combination of a lithograph press and a drying oven, a conveyor for the drying oven adapted to receive the lithographed plates from the press and convey the same through the oven, means for driving said press and said oven conveyor in synchronism, means for automatically disconnecting said conveyor from said press driving means when the press is stopped, an auxiliary motor, and devices driven thereby for automatically connecting to and driving the conveyor when said conveyor is released from the press driving means.

3. The combination of a lithograph press and a drying oven, a conveyor for the drying oven adapted to receive the lithographed plates from the press and convey the same through the oven, means for driving said press and said oven conveyor in synchronism, including clutch members having means for separating said clutch members when the speed of the oven conveyor falls below normal speed, an auxiliary source of power, and means for automatically connecting the same to the conveyor for continuing the travel thereof when disconnected from the press driving means.

4. The combination of a lithograph press and a drying oven, a conveyor for the drying oven adapted to receive the lithographed plates from the press and convey the same through the oven, means for driving said press and said oven conveyor in synchronism, including a sectional shaft, one section of which is connected to a conveyor and the other to the press, clutch members for connecting the sections of the shaft, and means for separating said clutch members when the speed of the oven conveyor falls below normal speed, an auxiliary source of power, a gear loose on the shaft section connected to the conveyor and driven continuously by said auxiliary source of power, a disk fixed to said oven shaft and cooperating devices between said disk and said gear for connecting the gear to the disk when said gear is moving faster than said disk and for permitting said disk to move faster than said gear.

In testimony whereof, I affix my signature.

CHARLES A. BICKFORD.